Figure 1:
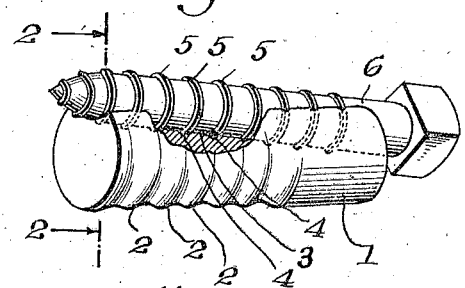

H. W. PLEISTER.
BOLT ANCHOR.
APPLICATION FILED APR. 16, 1915.

1,155,615.

Patented Oct. 5, 1915.

WITNESSES
Frederick Diehl
Louisa Loeber

INVENTOR
Henry W. Pleister
BY
Alan M. Johnson
ATTORNEY

UNITED STATES PATENT OFFICE.

HENRY W. PLEISTER, OF WESTFIELD, NEW JERSEY, ASSIGNOR TO HENRY B. NEWHALL.

BOLT-ANCHOR.

1,155,615.   Specification of Letters Patent.   Patented Oct. 5, 1915.

Original application filed January 20, 1915. Serial No. 3,328. Divided and this application filed April 16, 1915. Serial No. 21,636.

*To all whom it may concern:*

Be it known that I, HENRY W. PLEISTER, a citizen of the United States, and a resident of Westfield, in the county of Union and State of New Jersey, have invented certain new and useful Improvements in Bolt-Anchors, of which the following is a specification, taken in connection with the accompanying drawings, which form a part of the same.

This application is a division of my companion application Ser. No. 3,328 filed January 20, 1915.

My invention relates to bolt anchors, and one in which both the shield and the bolt or screw contact directly with the walls of the support in which they are mounted. More particularly it relates to a one part shield which may be manufactured and sold separately as an article of manufacture.

Previous to my invention it has been the common practice to have shields and anchors with two or more expanding members between which the bolt or screw was mounted, the different members of the shield or anchor being forced apart as the bolt or screw was inserted between them. In such bolt anchors the threads of the screw or bolt engage simply with the different members of the shield or anchor and do not engage directly with the walls of the orifice.

In the old practice the shields are formed of at least two members, and the anchors are provided with at least two tines or forks, it being understood that in the trade an "anchor" has an integral head from which extends two or more tines. Ordinarily the trade use the term "anchor" when referring to ductile material in which the male screw threads of the expanding member will cut their own coöperating female screw threads in the softer material of the anchor.

By my invention I omit entirely one of the expansible members and save all the expense incident to its manufacture, handling and shipping. By my invention the screw threads of the bolt or screw engage directly with the walls of the orifice as well as with my expansion shield. In my invention the complete "bolt anchor" comprises a shield member and the expanding member whether that be a bolt or screw. I also preferably though not necessarily, when the shield is formed of malleable iron or similar material provide it with screw threads. I also form my shield, of ductile material, if desired, in which case the screw threads of the bolt or screw will cut their own coöperating threads in the shield.

I have shown in the accompanying drawings several illustrative embodiments of my invention, but of course it is to be understood that my invention is not to be confined simply to the forms illustrated. In these drawings the same reference numerals refer to similar parts.

Figure 2:
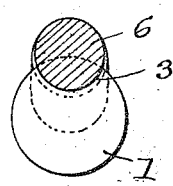
Figure 3:
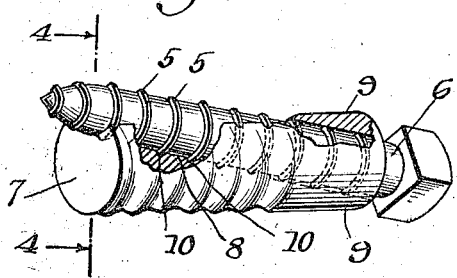
Figure 4:
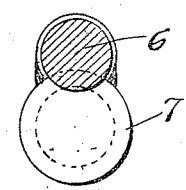
Figure 5:
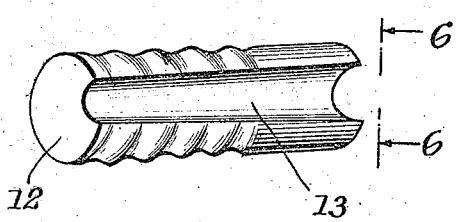
Figure 6:
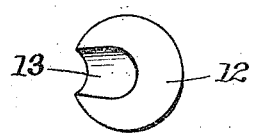
Figure 7:
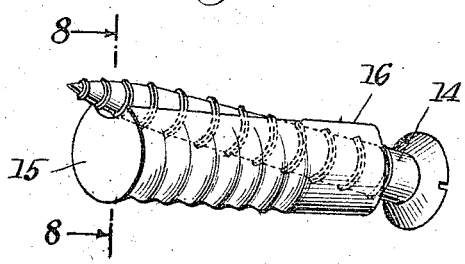
Figure 8:
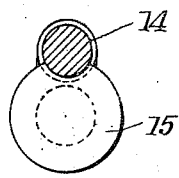

Figure 1 is a perspective view of one form of my invention; Fig. 2 is a vertical cross section taken on line 2, 2 of Fig. 1; Fig. 3 is a perspective view of a modification; Fig. 4 is a cross section taken on line 4, 4 of Fig. 3; Fig. 5 is a perspective view of one form of my ductile shield; Fig. 6 is an end view on the line 6, 6 of Fig. 5; Fig. 7 is a perspective view of my bolt anchor with a ductile shield; and Fig. 8 is a cross section substantially on the line 8, 8 of Fig. 7.

In all forms of my invention the lag bolt or wood screw, whichever is used, contacts directly with the surface of the hole in the support and also with the one part substantially cylindrical shield. In this invention my shield is substantially cylindrical with an open side to permit the expanding means to contact directly with the wall of the support. The expanding member may contact with the wall of the hole in the support substantially the entire length of the shield; or, in some cases, for less than the length of the shield. In this invention the shield may be of comparatively rigid material, as malleable iron, or it may be of ductile material in which the screw threads on the lag bolt or wood screw will cut their own coöperating screw threads in the ductile shield.

In Figs. 1 and 2, I have shown a substantially cylindrical shield 1 having preferably external ribs 2, 2 and a bore 3 inclined with relation to the longitudinal axis of the shield. In Figs. 1 and 2 this bore 3 is open throughout the length of the shield 1. If the shield is formed of malleable iron, it is preferably, though not necessarily, made with interrupted screw threads 4 to coöperate with the male threads 5 upon the lag bolt 6. These male threads 5 of the lag bolt also contact directly with the wall of the hole in the support (not shown) in the manner fully set forth in my parent application of which this is a division.

When the cylindrical shield 1 is placed in the hole prepared for it in masonry, brick, stone, concrete, wood, terra cotta, or any other material, and the lag bolt 6, for example, is screwed home, a most powerful gripping action is exerted by the lag bolt contacting both with the shield 1 and the wall of the hole. The taper of the lag bolt alone, or with the taper of the bore 3 serves to firmly and rigidly hold the work (not shown) to the face of the support.

In some cases I may form my substantially cylindrical shield 7, Figs. 3 and 4, with a partly closed inclined bore 8. In this form the bore 8 starts substantially concentric with the longitudinal axis of the shield, and then extends at an angle to said longitudinal axis emerging on the periphery or surface of the shield. This leaves a collar or closed portion 9 which may, or may not, be provided with interior screw threads. When the shield 7 is formed of rigid material as malleable iron, for example, I preferably cast the screw threads 10 in the open portion 11 of the inclined bore 8 and do not provide the interior of the collar 9 with screw threads.

My bolt anchor may be made with a ductile shield 12, Fig. 5, provided with an open bore 13 inclined to the longitudnal axis of the shield the same as in Fig. 1. In use the action is the same except that the male screw threads on the lag bolt 6 or wood screw 14 will cut their own coöperating screw threads in the shield 12.

In Figs. 7 and 8 I have shown the shield 15 of the ductile material and coöperating with a wood screw 14. The action of this bolt anchor is the same as that illustrated in Fig. 3 except that the wood screw 14, or lag screw 6, if one be used, will cut its own coöperating screw threads in the ductile shield. This shield is provided with a collar 16.

Having thus described this invention in connection with the illustrative embodiments thereof to the details of which I do not desire to be limited except as required by the scope of the appended claims, what is claimed as new and what it is desired to secure by Letters Patent is set forth in the appended claims.

What I claim as my invention and desire to secure by Letters Patent is:—

1. A bolt anchor comprising in combination a cylindrical shield, provided with an inclined bore and an opening in its side and a bolt to engage in said bore and opening to coöperate with the cylindrical shield.

2. A bolt anchor comprising in combination a cylindrical shield provided with a bore starting at one end substantially concentric with the longitudinal axis of the cylindrical shield, and then extending at an angle to said longitudinal axis of the shield and emerging on the periphery of the shield, and a bolt to engage said bore and opening formed on the periphery of the shield.

3. An article of manufacture comprising a cylindrical shield having an inclined bore extending to its periphery.

4. An article of manufacture comprising a cylindrical shield having a bore starting at one end substantially concentric with the longitudinal axis of the cylindrical shield and then extending at an angle to said longitudinal axis and emerging on the periphery of said shield.

5. A bolt anchor comprising in combination a substantially cylindrical shield with an inclined bore provided with interrupted screw threads and a bolt or screw to coöperate with the screw threads.

6. A bolt anchor comprising in combination a substantially cylindrical shield with an inclined bore provided with interrupted screw threads for a part of its length and a bolt or screw to coöperate with the screw threads.

7. An article of manufacture comprising a shield having a substantially cylindrical body and provided with an inclined bore extending to its periphery and with a collar.

8. In a bolt anchor the combination of a substantially cylindrical shield provided with an inclined bore extending out to its periphery, a collar, and a bolt or screw to engage in said bore and opening formed on the periphery of the shield.

HENRY W. PLEISTER.

Witnesses:
A. M. WILLIAMS,
M. R. RYAN.

Copies of this patent may be obtained for five cents each, by addressing the "Commissioner of Patents, Washington, D. C."